Patented Oct. 26, 1937

2,096,896

UNITED STATES PATENT OFFICE 2,096,896

AZODYESTUFFS

Ludwig Hauck, Leverkusen-I. G. Werk, Heinrich Clingestein, Cologne, and Fritz Graf, Leverkusen-I. G. Werk, Germany, assignors to General Aniline Works, Inc., New York, N. Y., a corporation of Delaware No Drawing. Application January 23, 1937, Serial No. 122,006. In Germany February 5, 1936

4 Claims. (Cl. 260—70)

The present invention relates to new tetrakisazodyestuffs, more particularly it relates to azodyestuffs which may be represented by the following general formula:

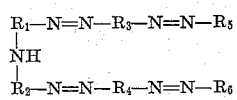

In the said formula $R_1$ and $R_2$ stand for radicals of the benzene series bearing the azo group in para-position to the imino group, $R_3$ and $R_4$ stand for radicals of diazotized 2-aminonaphtholsulfonic acids, and $R_5$ and $R_6$ stand for radicals of meta-arylenediamines being at least once substituted in one amino group by a hydroxyalkyl group, for example $R_5$ and $R_6$ each stands for the radical of meta-phenylenediamine which is substituted in one amino group by hydroxymethyl, hydroxyethyl, hydroxypropyl, a glycol radical, a glycerine radical and the like, or for a meta-phenylenediamine containing in each amino group one of the afore-mentioned substituents, or in which the two hydrogen atoms of one amino group are substituted by these substituents.

Our new dyestuffs are obtainable by coupling in an alkaline medium tetrazotized 4,4'-diaminodiphenylamines and their derivatives with 2-aminonaphtholsulfonic acids, tetrazotizing the disazodyestuffs thus obtained and coupling the same simultaneously or successively with 2 molecular proportions of the same or different meta-arylenediamine being at least once substituted in one amino group by a hydroxyalkyl group. The new, in general black dyestuffs, are distinguished from those of a similar constitution by a particularly good dischargeability and a bloomy shade of the dyeings obtained therewith.

The invention is illustrated by the following example: (the parts being by weight)

Example 27.9 parts of 4,4'-diaminodiphenylamine-2-sulfonic acid are tetrazotized in the usual manner with 13.8 parts of sodium nitrite. The tetrazo compound is coupled in the customary manner in a medium alkaline with sodium carbonate with 47.8 parts of 2-amino-8-naphthol-6-sulfonic acid. The dyestuff thus obtained is isolated, mixed with caustic soda lye while stirring, and 13.8 parts of sodium nitrite, and then 70 parts by volume of hydrochloric acid 19.5° Bé. are added. This tetrazotization mixture is added to a solution of 39.2 parts of hydroxyethyl-meta-phenylenediamine and 60 parts of sodium carbonate. The coupling mixture thus obtained is heated to 95° C., and the dyestuff is salted out and squeezed. After drying the dyestuff which corresponds in its free state to the following formula:

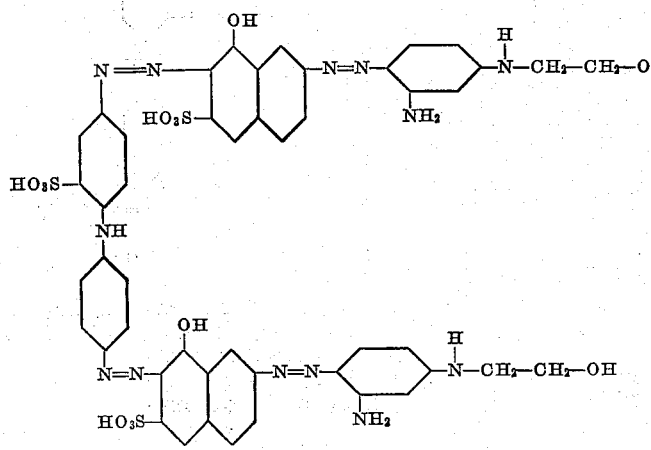

forms a dark powder, which dyes cotton and viscose bloomy black shades of good dischargeability.

When using instead of 4,4'-diaminodiphenylamine-2-sulfonic acid 4,4'-diaminodiphenylamine-3'-methyl-2-sulfonic acid or 4,4'-diaminodiphenylamine-3'-methoxy-2-sulfonic acid, and/or instead of 2-amino-8-naphthol-6-sulfonic acid 2-amino-8-naphthol-3.6-disulfonic acid or 2-amino-5-naphthol-7-sulfonic acid, and/or instead of the hydroxyethyl-meta-phenylenediamine wholly or partially its homologues and substitution products, as for example hydroxyethyl-meta-toluylene-diamine, 1-chloro-2-amino-4-hydroxyethylaminobenzene or 1(dihydroxypropylamino)-3-aminobenzene, dyestuffs of similar properties are obtained.

We claim:

1. Tetrakisazodyestuffs of the following general formula:

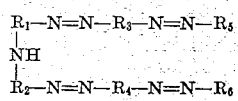

wherein $R_1$ and $R_2$ stand for radicals of the benzene series bearing the azo group in para-position to the imino group, $R_3$ and $R_4$ stand for radicals of diazotized 2-aminonaphtholsulfonic acids, and $R_5$ and $R_6$ stand for radicals of meta-arylenediamines being at least once substituted in one amino group by a hydroxyalkyl group, dyeing cotton generally bloomy black shades of good dischargeability.

2. Tetrakisazodyestuffs having in the free state the following general formula:

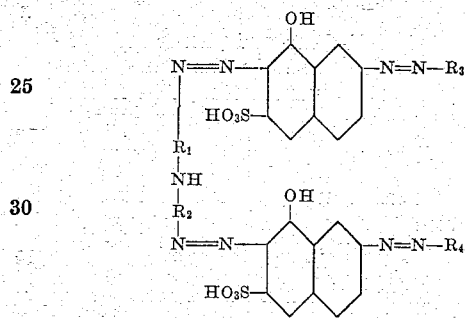

wherein $R_1$ and $R_2$ stand for radicals of the benzene series bearing the azo group in para-position to the imino group, $R_3$ and $R_4$ stand for radicals of meta-arylenediamines being at least once substituted in one amino group by a hydroxyalkyl group, dyeing cotton generally bloomy black shades of good dischargeability.

3. Tetrakisazodyestuffs having in the free state the following general formula:

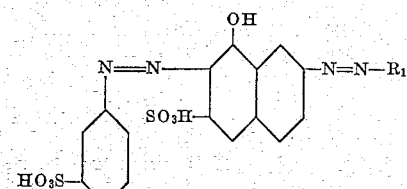

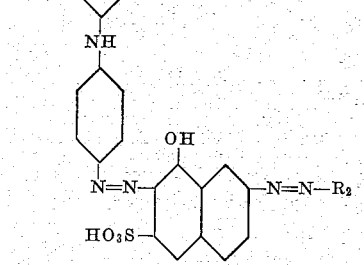

wherein $R_1$ and $R_2$ stand for radicals of meta-arylenediamines being at least once substituted in one amino group by a hydroxyalkyl group, dyeing cotton generally bloomy black shades of good dischargeability.

4. The tetrakisazodyestuff having in the free state the following formula:

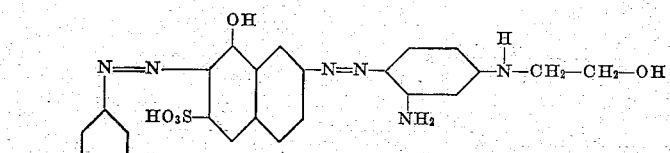
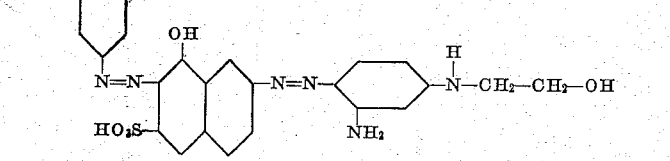

dyeing cotton and viscose bloomy black shades of good dischargeability.

LUDWIG HAUCK.
HEINRICH CLINGESTEIN.
FRITZ GRAF.